United States Patent [19]

Pulk et al.

[11] Patent Number: 4,550,385
[45] Date of Patent: Oct. 29, 1985

[54] DYNAMIC LOW TIRE PRESSURE DETECTION SYSTEM FOR AIRCRAFT

[75] Inventors: Brian E. Pulk, Redmond; Charles D. Bateman, Bellevue, both of Wash.

[73] Assignee: Sundstrand Data Control, Inc., Rockford, Ill.

[21] Appl. No.: 403,437

[22] Filed: Jul. 30, 1982

[51] Int. Cl.[4] .............................. B60C 23/00
[52] U.S. Cl. ...................... 364/558; 73/579; 73/146.5; 116/34 R; 340/58; 364/463
[58] Field of Search ............. 364/424, 558, 559, 463; 73/146.5, 579, 146.2, 37.6, 45.6, 49, 700, 709, 714; 116/34 R; 200/61.25; 340/58, 521

[56] References Cited

U.S. PATENT DOCUMENTS

| | | | |
|---|---|---|---|
| 1,872,068 | 8/1932 | Brown | 340/58 |
| 2,358,370 | 9/1944 | Williams | 177/311 |
| 2,499,669 | 3/1950 | Murat | 340/58 X |
| 3,526,873 | 9/1970 | Burt | 340/58 |
| 3,581,277 | 5/1971 | Beatty et al. | 340/58 |
| 3,613,075 | 10/1971 | Griffiths et al. | 340/58 |
| 3,614,122 | 10/1971 | Herren | 340/58 X |
| 3,691,524 | 9/1972 | Frost et al. | 340/58 |
| 3,707,701 | 12/1972 | Neu | 340/58 |
| 3,801,787 | 4/1974 | Johnsen | 340/58 X |
| 3,900,828 | 8/1975 | Lage et al. | 340/58 X |
| 4,086,564 | 4/1978 | Claxton | 340/58 |
| 4,180,794 | 12/1979 | Claxton | 340/58 |
| 4,269,070 | 5/1981 | Nelson et al. | 73/779 |
| 4,272,755 | 6/1981 | Broetto | 340/58 |
| 4,312,042 | 1/1982 | Bateman | 364/463 |
| 4,459,579 | 7/1984 | David et al. | 340/58 |

Primary Examiner—Errol A. Krass
Assistant Examiner—Edward R. Cosimano
Attorney, Agent, or Firm—Wood, Dalton, Phillips, Mason & Rowe

[57] ABSTRACT

A dynamic low tire pressure detection system for detecting the presence of a low tire mounted on a structural member of an aircraft, such as a bogie beam or nose axle, includes a pair of inclinometers mounted on the structural member and adapted to sense the bend therein. The signals from the inclinometers are combined to generate signals representing the weight carried by the structural member. When the aircraft is moving, the weight signal is analyzed to determine whether particular frequency components are present therein. The amplitude of these frequency components are modified by a gain factor dependent upon a reference amplitude and are added to develop a tire pressure signal. The tire pressure signal is compared against a trip setting to determine whether the tire pressure is within acceptable limits. If the tire pressure is outside of the range of acceptable tire pressures, a signal is generated to warn of a potentially dangerous condition to the aircraft operating personnel.

14 Claims, 7 Drawing Figures

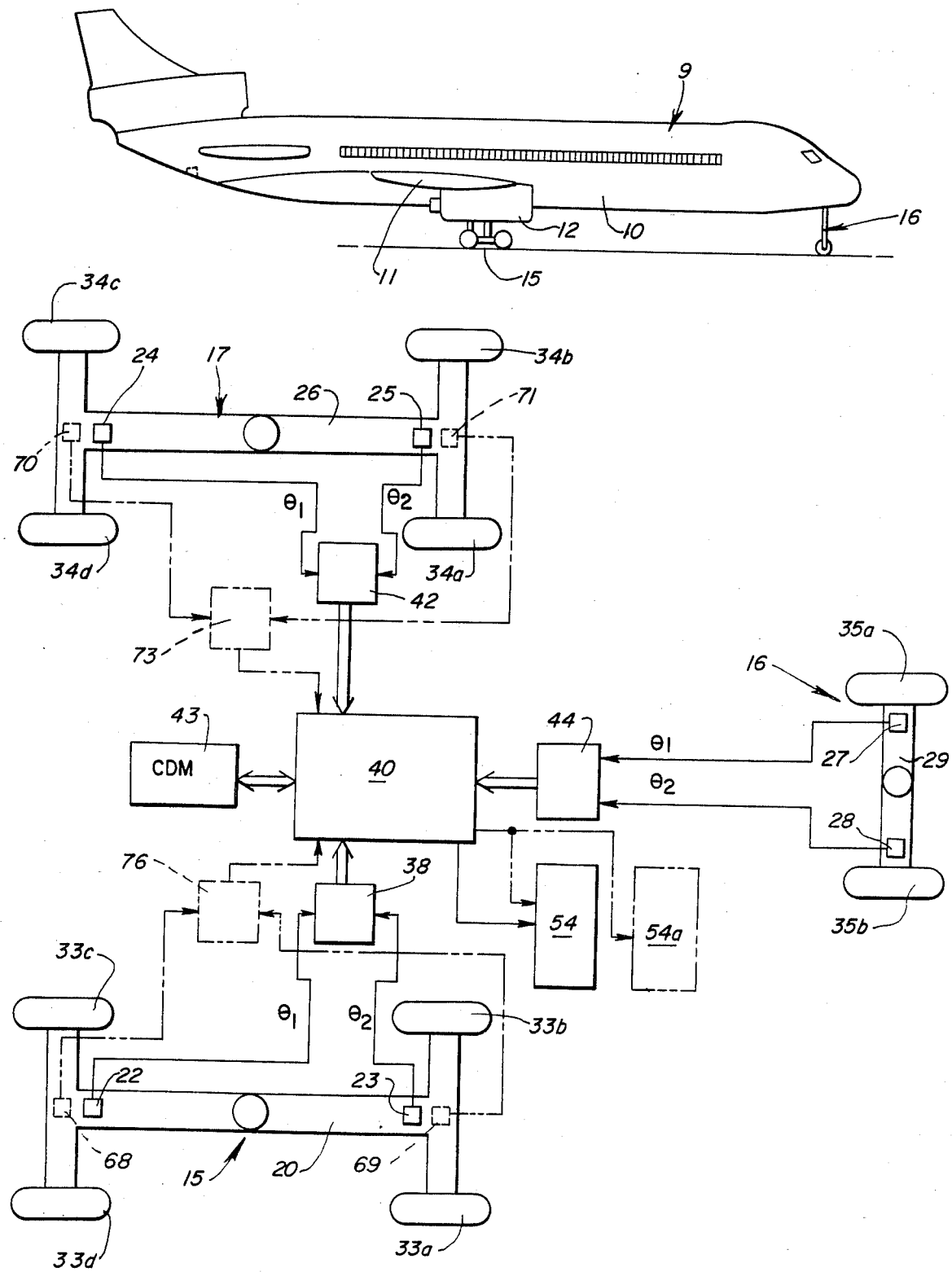

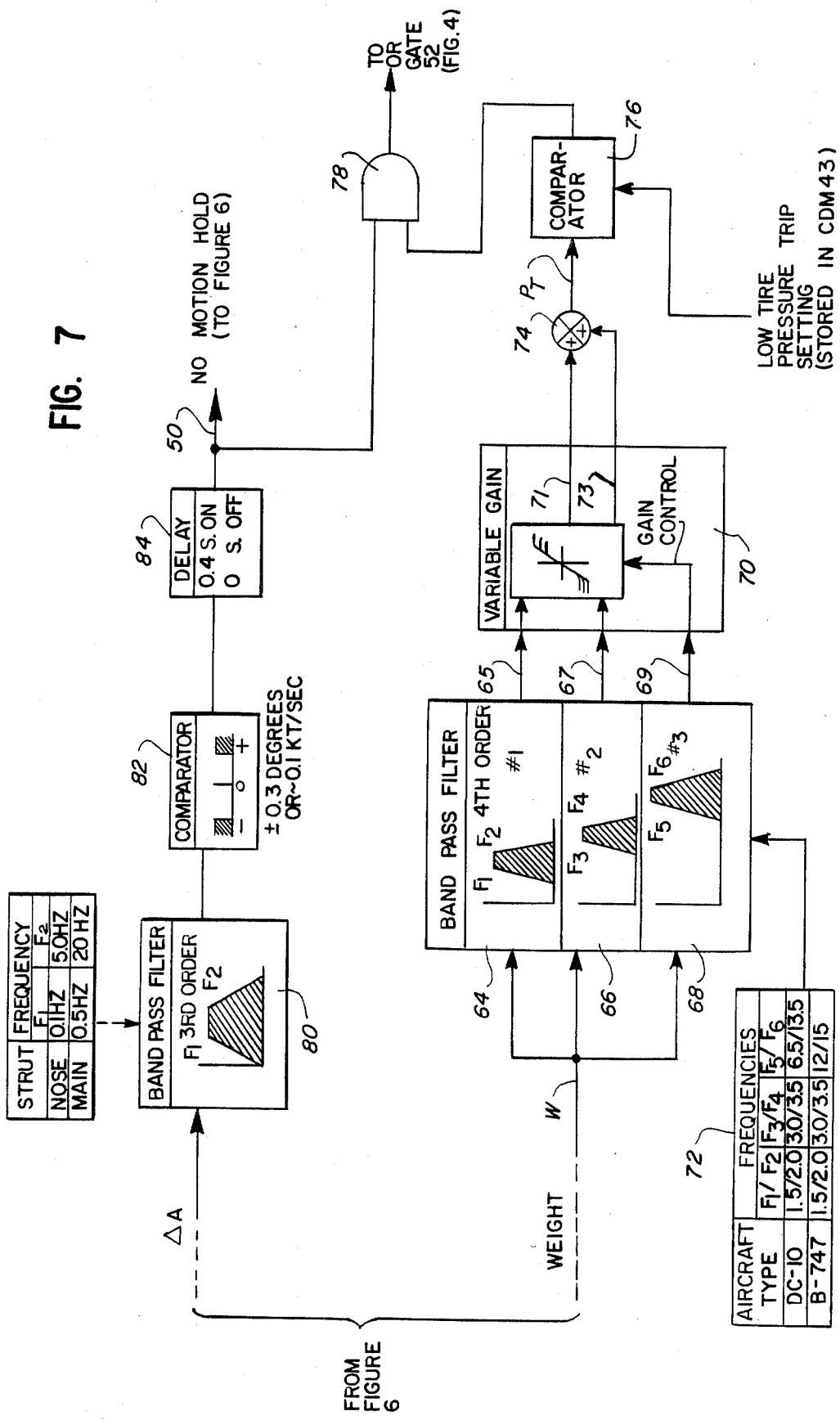

DYNAMIC LOW TIRE PRESSURE DETECTION SYSTEM FOR AIRCRAFT

DESCRIPTION

BACKGROUND OF THE INVENTION

The present invention relates generally to aircraft low tire pressure detection systems, and more particularly to a system for detecting and indicating an underpressurized tire on an aircraft landing gear while the aircraft is taxiing or otherwise moving on the ground.

It is extremely important that all of the tires carried by aircraft landing gear are properly pressurized to insure safe and reliable takeoff and landing procedures. Often, this safety consideration requires personnel to visually inspect the landing gear and to measure and check individual tire pressures prior to takeoff. These visual inspections and measurements can be difficult to accomplish under severe conditions such as extreme winter weather.

Moreover, even after the tires pressures have been checked prior to taxiing for takeoff, one or more tires can become underinflated, a dangerous condition which would go undetected by the flight crew. Unequal tire pressures can result in unequal load sharing and tire heating. Aircraft accidents have resulted where it was suspected that one tire was losing tire pressure during taxiing.

A successful system for generating an indication of low tire pressure is shown and described in Bateman U.S. Pat. No. 4,312,042, entitled "Weight, Balance and Tire Pressure Detection Systems", and assigned to the assignee of the instant application. This system utilizes two pairs of inclinometers mounted on a structural member carrying the landing gear tires with the sensitive axes of one pair of inclinometers being disposed at right angles to the sensitive axes of the other pair. The signal outputs from the first pair of inclinometers are subtracted to generate a signal indicating the tilt of the structural member. The signal outputs from the second pair of inclinometers are combined to generate a signal indicating the torsion in the structural member. The tilt and torsion signals are used to locate a particular tire of the set of tires carried by the structural member which is underpressurized.

While the system described above is capable of detecting an underpressurized tire, it has been found that the sensitivity of the system is limited by the variation in parking, taxiway and runway surfaces and slopes. Since the variation in these factors may be extreme, the system must be adjusted to generate a low tire pressure indication when the tire is essentially flat, e.g. when a loss of 130 psi has occurred in a normally inflated 185 psi pressurized tire. However, even when the system is set to detect such a large loss of pressurized air, nuisance warnings of a possible flat tire can occur approximately once every 50 flight segments, chiefly at specific airports and gate positions. It is desirable to reduce this frequency of erroneous indications.

SUMMARY OF THE INVENTION

In accordance with the present invention, a dynamic low tire pressure detection system for detecting the presence of a low tire while the aircraft is taxiing or otherwise moving on the ground utilizes output signals developed by one or more pairs of inclinometers mounted on each aircraft weight supporting structure, such as a bogie beam or axle.

The signals from each pair of inclinometers are combined to generate a signal representing the weight carried by the structural member. The frequency components of the weight signal are analyzed and if particular frequencies are detected in the signal having an amplitude exceeding a specified level, then a signal is generated indicating low tire pressure.

The system of the present invention has a high degree of sensitivity and yet provides a large margin against nuisance warnings. Moreover, the system is capable of sensing the presence of a low tire regardless of the slope of the surface on which the aircraft is moving.

BRIEF DESCRIPTION OF THE DRAWINGS

FIG. 1 is a side elevational view of a typical aircraft with which the invention disclosed herein is used;

FIG. 2 is a diagrammatic plan view of an aircraft landing gear in conjunction with a block diagram showing the system of the present invention;

FIG. 7 is a block diagram of the block 61 shown in FIG. 6.

DESCRIPTION OF THE PREFERRED EMBODIMENT

Figure 3:
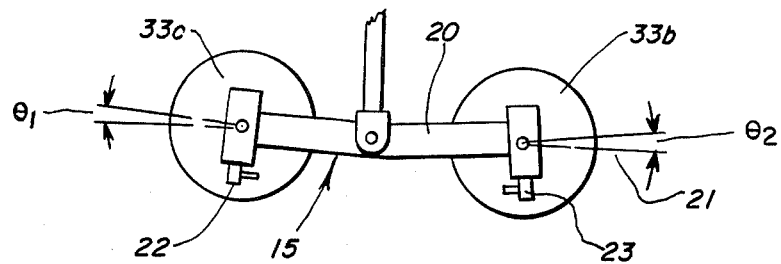
FIG. 3 is a diagrammatic view of the main landing gear shown in FIG. 1.

Referring now to FIG. 1, an aircraft, indicated generally at 9 includes a fuselage 10 and a pair of wings 11 each of which mounts a jet engine 12. Referring also to FIG. 2, in the illustrated embodiment, the aircraft 9 includes a nosegear 16 and a pair of retractable main landing gear 15,17 supported from the aircraft wing.

The sensing of a low tire pressure condition for each of the landing gear 15,16,17 is accomplished by sensing and analyzing the frequency response of the structural weight-supporting members, such as the bogie beams 20,26 of the main landing gear 15,17 and the axle 29 of the nose gear 16 as the aircraft 9 is moving on a taxiway or runway.

The angle of bending of the structural member, such as the bogie beam 20, is proportional to the weight or force on the member. The weight on the member is independent of the tilt or inclination of the surface upon which the aircraft is moving, and hence may be used to develop an indication of the pressurization of the tires carried by the member, as noted more specifically below.

Referring to the schematic view of the main landing gear 15, shown in FIG. 3, the bogie beam 20 is shown with an exaggerated bend to illustrate the principles of the invention. An inertial reference plane is indicated by a horizontal, broken line 21. The angle of bending of the beam is represented by the reference angles $\theta_1$ and $\theta_2$. The angles $\theta_1$ and $\theta_2$ are sensed by transducers 22,23 which may be inclinometers or other transducers capable of developing signals representing the angle of bend of the member at first and second locations with respect to the inertial plane.

Alternatively, the frequency response of the structural members 15-17 may be sensed by other means, such as strain gage transducers or variable reluctance sensors which detect the stress in the members 15-17 caused by movement of the aircraft over the runway.

In the preferred embodiment, the transducers 22,23 are servoed accelerometers which directly sense the angles $\theta_1$ and $\theta_2$, such as that disclosed in U.S. Pat. No. 3,702,073, the disclosure of which is hereby incorporated by reference.

The accelerometers 22,23 are rigidly attached to the bogie beam 20 at opposite ends thereof. The sensitive axes of the accelerometers 22,23 are aligned 180° with respect to one another and parallel to the longitudinal axis of the beam 20 when no load is applied thereto. As seen in FIG. 2, similar accelerometers 24,25 are mounted on the bogie beam 26 of the main landing gear 17, while accelerometers 27,28 are mounted on the axle 29 of the nose gear 16. In each case, the sensitive axes of each pair of accelerometers 24,25 or 27,28 are disposed 180° with respect to one another and are mounted on opposite ends of the structural member.

The mounting of the inclinometers 22-25, 27 and 28 on the structural members 20,26,29 is shown more particularly in Bateman U.S. Pat. No. 4,312,042, the disclosure of which is hereby incorporated by reference.

The angles $\theta_1$ and $\theta_2$ sensed by each pair of accelerometers contain components dependent upon: (1) the angle of the beam or axle caused by a low tire pressure condition or by airport ramp or runway tilt; (2) the beam bend angles caused by a load applied thereto; and (3) sensor axis misalignment and bias errors. In general, the angles $\theta_1$ and $\theta_2$ are defined as follows (formulas 1 and 2):

$$\theta_1 = \theta_B + \theta_{L1} + \theta_{A1} \quad (1)$$

$$\theta_2 = -\theta_B + \theta_{L2} + \theta_{A2} \quad (2)$$

In the foregoing equations, $\theta_B$ is the angle of the beam or axle caused by a low tire pressure condition or by airport ramp or runway tilt. $\theta_{L1}$ and $\theta_{L2}$ are the beam bend angles caused by a load. $\theta_{A1}$ and $\theta_{A2}$ are sensor axis misalignment and bias terms.

A signal W, proportional to the weight applied to the structural member, e.g. the bogie beam 15, is obtained by summing the outputs of the accelerometers 22,23 to derive the following result:

$$W = \theta_1 + \theta_2 = \theta_{L1} + \theta_{L2} + \theta_{A1} + \theta_{A2}$$

Referring specifically to bogie beam 20, the outputs of the two servoed accelerometers 22,23 are summed to cancel out the beam angle $\theta_B$ caused by airport ramp or runway tilt. The angle factors $\theta_{A1},\theta_{A2}$ are measured during automatic zeroing of the system in flight and do not affect the calculation. In summary, weight on the bogie beam or the nose gear axle is proportional to the sum of the output signal of the two accelerometers associated therewith.

As seen in FIG. 2, each of the main landing gears 15,17 has four tires 33a-33d,34a-34d while the nose gear 16 carries two tires 35a,35b.

It has been found that each of the structural members 15,16,17 has a particular frequency response when all the tires carried thereby are properly pressurized. However, when one of the tires is underpressurized, such as the tire 33a on bogie beam 20, the frequency response of the associated beam changes.

Figure 5:
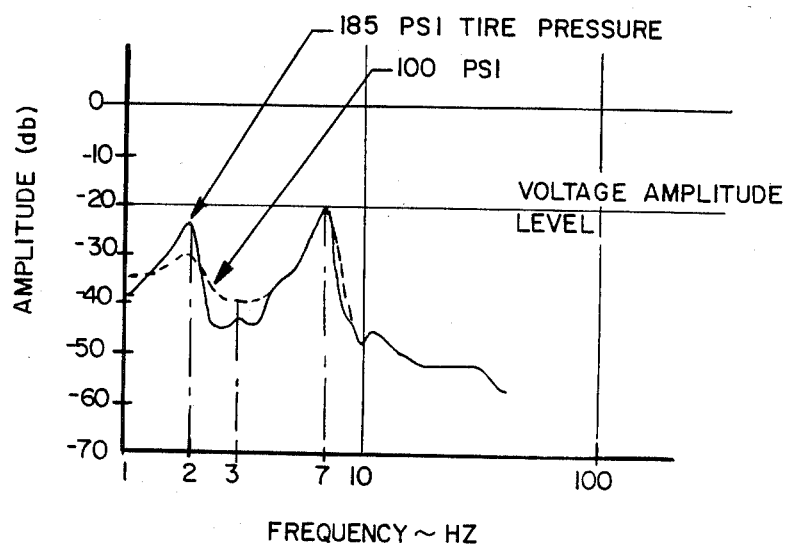
FIG. 5 is a graph showing the frequency response of an aircraft bogie beam or axle during movements of the aircraft.

Referring specifically to FIG. 5, there is illustrated a pair of frequency response curves for one of the bogie beams 15,17 of a DC 10 aircraft. The curve shown in solid lines illustrates the frequency response of the bogie beam when all of the tires carried thereby are properly pressurized. However, when one of the tires, such as the tire 33a on the bogie beam 20, is underinflated, e.g. is reduced in pressure from 185 psi normal operating pressure to 100 psi, the frequency response of the bogie beam 15 changes to the dotted curve shown in FIG. 5. It can be seen that changes occur in the amplitude of the frequency response at the two and three hertz frequencies. Specifically, the amplitude of the two hertz frequency component decreases from its amplitude at normal pressurization, while the three hertz component amplitude increases when the tire pressurization is reduced by this amount.

Accordingly, by analyzing the signals from the accelerometers while the aircraft 9 is moving, one may detect whether a low tire pressure condition exists.

As seen in FIG. 2, the outputs from the accelerometers mounted on each structural member, for example accelerometers 22,23 associated with the bogie beam 20, are coupled to computing circuits 38 which perform the adding function to derive the weight signal. Moreover, the computing circuit 38 also derives a signal representing the angle of the structural member with respect to an inertial reference plane by subtracting $\theta_2$ from $\theta_1$. The angle signal is used to detect motion of the aircraft 9, as noted more specifically below.

The angle and weight signals, denoted A and W, respectively, are coupled to a computer 40 which receives weight and angle signals from similar computing circuits 42,44 associated with the accelerometers mounted on the bogie beam 26 and the nose axle 29. The computer 40 is also interactively coupled to a command data module, or CDM 43 which is a memory unit in which is stored various types of information, as will be described in greater detail hereinafter. The CDM 43 is a nonvolatile storage unit consisting of read only memory units (ROM) or erasable programmable read only memory units (EPROM).

The low tire pressure detection system of the present invention utilizes stored values to develop an indication of low tire pressure. Accordingly, it is important to have a nonvolatile memory in the CDM 43 to prevent the loss of information which may be caused by power shutdown.

Figure 4:
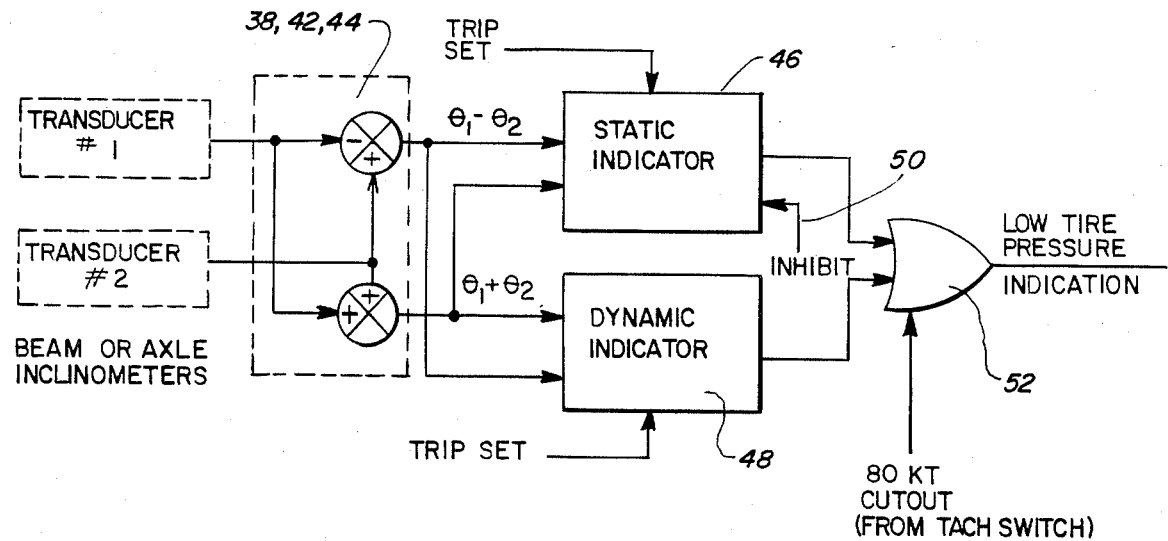
FIG. 4 is a block diagram of a combined dynamic and static low tire pressure detection system incorporating the system of the present invention.

Referring also to FIG. 4, there is illustrated a low tire pressure indicator system 44 which incorporates as a portion thereof the dynamic low tire detection system of the the present invention. The indicator system 44 also includes a static low tire pressure detection system which is operative during the time that the aircraft 9 is at rest on the ground. A detailed description of the static detection system is contained in U.S. Pat. No. 4,506,328 issued to Bateman on Mar. 19, 1985, entitled "Static Low Tire Detection System for Aircraft", and assigned to the assignee of the instant application.

Briefly, the angle and weight signals A and W developed by the computing circuits 38, 42 or 44 are coupled to a static indicator 46 and to a dynamic indicator 48, only one of which is operative at any particular time. For example, when the aircraft is moving on the ground, the dynamic indicator 48 is actuated and the static indicator is deactuated by an inhibit signal on a line 50. The circuitry for generating the inhibit signal is described hereinafter.

Both of the static and dynamic indicators 46,48 receive trip set signals which represent a range of acceptable tire pressures. If a tire pressure is sensed outside of this range, a signal is generated by either of the indicators 46,48. The outputs from the static and dynamic indicators 46,48 are coupled to an OR gate 52 which develops a signal indicating the presence or absence of a depressurized tire.

The OR gate 52 also receives a signal from the aircraft tachometer to inhibit the indication of low tire pressurization when the aircraft is moving at a speed of, for example, 80 knots. It has been found that at speeds over 80 knots, the sensitivity of the system of the present invention is degraded, and accordingly, it is desirable to inhibit the system output above this speed.

The functions performed by the static and dynamic indicators 46,48 are implemented in the computer 40 shown in FIG. 2, which may be an analog or general purpose digital computer. The computer 40 may drive an output device 54 such as a cathode ray tube, an indicator light, an audible alarm or the like, to provide an indication of low tire pressurization.

Figure 6:
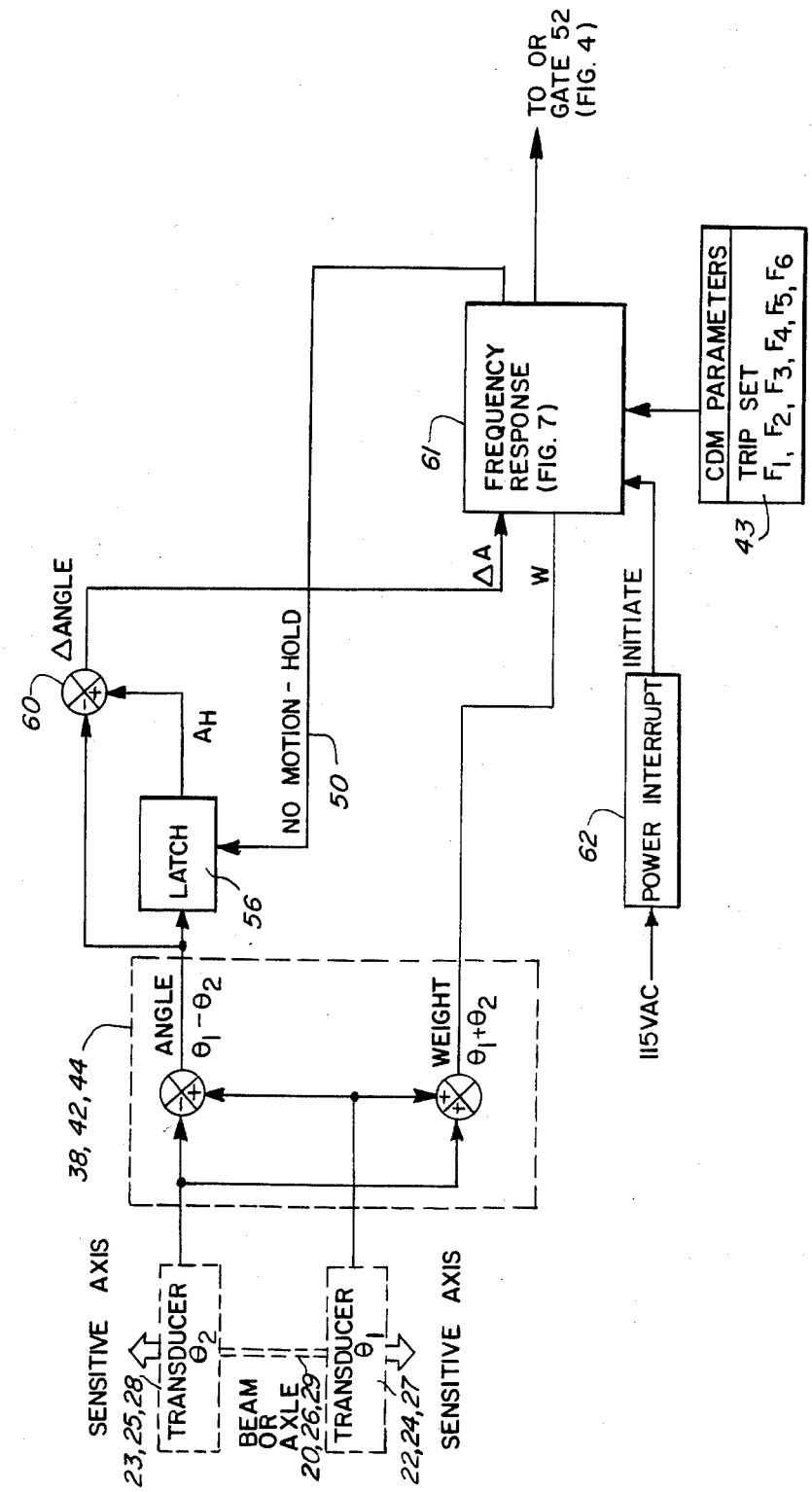
FIG. 6 is a block diagram of the dynamic low tire pressure detection system of the present invention.

Referring now to FIG. 6, there is illustrated in block diagram form the dynamic indicator 48 shown in FIG. 4. It should be noted that the outputs from each pair of transducers are processed in exactly the same way by the computer 40, and hence the circuitry in FIG. 6 will be described only in connection with the accelerometers 22,23 associated with the bogie beam 20.

The signals from the transducers 22,23 are coupled to the computing circuits 38, which derive the weight and angle signals W,A discussed above. The angle signal is coupled to a latch 56 which is operative to store the current value of this signal in the CDM 43 when the inhibit signal appearing on the line 50 is removed. The inhibit signal is generated only when the aircraft 9 is moving on the ground, as noted more specifically hereinafter.

The stored angle signal, denoted $A_H$, is coupled to a summing junction 60, where it is compared with subsequent signals representing the angle of the structural member or bogie beam 20 with respect to the inertial reference plane. The resultant signal, denoted $\Delta A$ is coupled to a frequency response block 61 which is shown in greater detail in FIG. 7.

The frequency response block 61 also receives input parameters from the CDM 43, the signal W representing the weight on the structural member and a signal from a power interrupt circuit 62. The circuit 62 senses the supply voltage from the power units of the aircraft and provides an initiate signal when full supply potential is reached. The circuit 62 prevents transients from reaching the frequency response block 61 to prevent an erroneous indication of tire pressurization.

The block 61 develops an output signal in accordance with the signals $\Delta A$ and W and the parameters stored in the CDM 43. The output signal is coupled to the OR gate 52 along with an output signal from the static indicator 46, shown in FIG. 4. The block 61 also generates the inhibit signal coupled to the hold circuit 56 over the line 50.

Referring now to FIG. 7, there is shown in greater detail the frequency response block 61 shown in FIG. 6. The weight signal W is coupled to a series of band pass filters 64,66,68 which develop filtered output signals on lines 65,67,69, respectively. In the preferred embodiment the band pass filters 64,66,68 are fourth order filters. The half power or band limit frequencies $F_1$-$F_6$ for the band pass filters 64,66,68 are obtained from the CDM 43 and are a function of aircraft type. As shown in block 72, the frequencies $F_1$-$F_4$ are identical for DC 10 and Boeing 747 aircraft types. However, the frequencies $F_5$ and $F_6$ are different owing to the difference in the characteristic "walking" or maximum amplitude frequency for these two types of aircraft. For a DC 10 aircraft, the frequency response of the bogie beam typically has a maximum in the range of 7 hertz. However, for a Boeing 747 aircraft, the "walking" frequency, or the point at which a maximum occurs, is in the vicinity of 13 hertz. Other types of aircraft may exhibit similar or different frequency maxima and minima, depending upon bogie beam and axle design.

The filtered signals on the lines 65,67,69 are coupled to a variable gain circuit 70 having a gain factor K dependent upon the amplitude of the signal from the band pass filter 68. The band pass filter 68 generates a filtered signal having an amplitude equal to the amplitude of the "walking" frequency component. As previously noted, for a DC 10 this signal has a characteristic frequency of 7 hertz. It has been found that a peak occurs at this 7 hertz frequency independent of the pressurization of the tires carried by the structural member. Accordingly, the 7 hertz signal is utilized as a reference for the 2 hertz and 3 hertz signals.

The 2 hertz signal coupled on the line 65 is multiplied by the variable gain factor K and is coupled over a line 71 to a summing junction 74. Similarly, the 3 hertz signal developed on the line 67 is modified by the variable gain factor K and is coupled over a line 73 to the summing junction 74 where it is added to the signal on the line 71. By referencing the 2 hertz and 3 hertz signals to the 7 hertz signal, the relative amplitudes of these signals are caused to be independent of runway roughness or deviation as the aircraft moves thereover, and hence greater sensitivity is achieved.

The summed signal from the summing junction 74 is coupled to a comparator 76 which receives a trip set input from the CDM 43 representing the range of acceptable or safe tire pressures. If the signal from the summing junction 74 is outside this range of tire pressure, then a signal is coupled to an AND gate 78 which is in turn coupled to the OR gate 52.

A second input to the AND gate 78 is coupled to a motion detector which also controls the latch 56 shown in FIG. 6. The motion detector receives the signal $\Delta A$ and analyzes the signal to determine whether the aircraft is moving on the ground. The signal $\Delta A$ is filtered in a band pass circuit 80 to derive a filtered signal which contains particular frequency components when the aircraft is moving. In a typical application, e.g. for a DC 10 aircraft, the frequency components of interest are different for the nose axle than the for the main gear bogie beams. The band pass filter receives half power or band pass limit frequencies $F_1,F_2$ stored in the CDM 42 as follows:

| Strut | $F_1$ | $F_2$ |
| --- | --- | --- |
| Nose axle | 0.1 hz. | 5.0 hz. |
| Bogie beam | 0.05 hz. | 20 hz. |

The band pass filter is a third order filter which is in effect a pseudo double-integrator which converts the acceleration information $\Delta A$ into distance information.

It should be noted that the limit frequencies $F_1$ and $F_2$ are dependent upon axle and beam geometry, and may be different than those noted above for other types of aircraft.

The determination of whether the aircraft is moving is performed in a comparator 82 which receives a trip set signal from the CDM 43, which value must be exceeded by the amplitude of the filtered signal from the circuit 80 in order to generate the inhibit signal. In the preferred embodiment, the signal from the band pass filter 80 must exceed $\pm 0.3°$ or approximately 0.1 knots per second.

A delay circuit 84 prevents the generation of the inhibit signal until a period of 0.4 seconds has elapsed from the time the comparator 82 has generated a high state signal. The delay circuit will provide an immediate indication, i.e. will provide no delay, when the output of the comparator drops to a low state.

Alternatively, the inhibit signal on the line 50 may be generated manually by aircraft operating personnel immediately following the point at which the aircraft comes to rest, in which case the motion detector need not be used. Instead, the signal may be generated by manual opening or closing of a switch located in the cockpit of the aircraft.

The signal on the line 50 is coupled to the AND gate 78 so that a signal representing low tire pressure is coupled to the OR gate 52 only when both of the outputs of the comparator 76 and the delay circuit 84 are in a high state. In other words, the low tire pressure signal from the comparator 76 is inhibited when the aircraft is not moving.

We claim:

1. A dynamic low tire pressure detection system for detecting the presence of a low tire supporting a structural member of an aircraft and rolling on a surface comprising:
   first and second transducers mounted on the structural member for developing first and second signals having frequencies dependent upon the frequency of vibration of the structural member;
   means for summing the first and second signals to develop a weight signal which is independent of the tilt of the structural member relative to a reference plane; and
   means for deriving a tire pressure signal from at least one frequency component of the weight signal to obtain an indication of tire pressurization.

2. The low tire pressure detection system of claim 1, further including means for generating a low tire pressure signal when the tire pressure signal is outside of a range of acceptable pressures.

3. The low tire pressure detection system of claim 1, wherein the transducers are servoed accelerometers for sensing the angle of the structural member at first and second locations.

4. The low tire pressure detection system of claim 1, wherein the sensitive axes of the inclinometers are disposed 180° with respect to one another.

5. The low tire pressure detection system of claim 1, wherein the deriving means includes:
   first and second band pass filters for developing first and second filtered signals containing first and second frequency components, respectively;
   means for rendering the first and second filtered signals independent of variations of the surface upon which the tire is rolling to develop first and second output signals; and
   means for summing the first and second output signals to derive the tire pressure signal.

6. The low tire pressure detection system of claim 5, wherein the rendering means includes:
   a third band pass filter for developing a third filtered signal containing a third frequency component having an amplitude independent of tire pressurization; and
   a variable gain amplifier coupled to the band pass filters for multiplying the amplitudes of the first and second filtered signals by a gain factor dependent upon the amplitude of the third frequency component to obtain the first and second output signals.

7. The low tire pressure detection system of claim 1, further including:
   means for detecting movement of the structural member; and
   means for inhibiting the low tire pressure signal when the structural member is not moving.

8. The low tire pressure detection system of claim 7, wherein the means for detecting movement includes
   first means for subtracting the first and second signals to develop an angle signal representing the angle of the structural member relative to a reference plane;
   means for storing the angle signal at a particular time when the member is not moving;
   second means for subtracting the subsequent angle signals against the stored angle signal to derive an angle difference signal; and
   means for integrating the angle difference signal to obtain an indication of movement.

9. The low tire pressure detection system of claim 8, wherein the integrating means comprises a band pass filter.

10. The low tire pressure detection system of claim 8, further including means for comparing the integrated angle difference signal with a predetermined limit to generate a signal representing movement of the structural member.

11. A low tire pressure detection system for detecting the presence of a low tire which supports a structural member of a moving aircraft, the aircraft movement causing the structural member to vibrate, comprising:
   first and second accelerometers mounted on the structural member at opposite ends thereof for developing first and second signals;
   means coupled to the accelerometers for deriving a weight signal representing the weight carried by the structural member;
   first, second and third band pass filters, each coupled to the weight signal for developing first, second and third filtered signals containing low, middle and high frequency components, respectively,
   a variable gain amplifier coupled to the band pass filters for multiplying the amplitudes of the first and second filtered signals by a gain factor dependent upon the amplitude of the third frequency component to obtain first and second output signals; and
   means for summing the first and second output signals to obtain a tire pressure signal representing tire pressure.

12. The low tire pressure detection system of claim 11, further including a comparator for comparing the tire pressure signal with a tire pressure limit to determine whether a low tire pressure condition exists.

13. The low tire pressure detection system of claim 12, further including:
   means coupled to the first and second signals for generating a movement signal representing movement of the aircraft; and
   an AND gate coupled to the movement signal generating means and to the comparator for generating a signal indicating the existence of a low tire pressure condition only when the outputs of the movement signal generating means and the comparator are both in a high state.

14. A low tire pressure detection system for detecting the presence of a low tire which supports a structural member of an aircraft moving on a surface comprising:
   means, operatively connected to the structural member, for generating a frequency signal having a frequency component functionally related to the weight of the aircraft as the aircraft moves on the surface;
   means for deriving a tire pressure signal from said frequency component.

* * * * *